(12) United States Patent
Porter et al.

(10) Patent No.: US 10,370,123 B2
(45) Date of Patent: Aug. 6, 2019

(54) AIRCRAFT CONTROL SURFACE ACTUATION SYSTEMS AND METHODS

(71) Applicant: The Boeing Company, Chicago, IL (US)

(72) Inventors: John W. Porter, Renton, WA (US); Amber Beasley, Costa Mesa, CA (US); Peter Partel, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/820,016

(22) Filed: Nov. 21, 2017

(65) Prior Publication Data

US 2019/0152623 A1    May 23, 2019

(51) Int. Cl.
*B64F 5/60*    (2017.01)
*B64D 45/00*    (2006.01)

(52) U.S. Cl.
CPC ............ *B64F 5/60* (2017.01); *B64D 45/0005* (2013.01); *B64D 2045/0085* (2013.01)

(58) Field of Classification Search
CPC .................. B64F 5/60; B64D 45/0005; B64D 2045/0085
USPC .......................................................... 701/3
See application file for complete search history.

(56) References Cited

U.S. PATENT DOCUMENTS

| | | | | |
|---|---|---|---|---|
| 5,077,671 A | * | 12/1991 | Leslie | G05B 23/0256 324/73.1 |
| 5,541,405 A | * | 7/1996 | Hassler, Jr. | B64C 13/503 250/227.11 |
| 2009/0012657 A1 | * | 1/2009 | Knotts | G05D 1/0038 701/3 |
| 2012/0101663 A1 | * | 4/2012 | Fervel | B64C 13/42 701/3 |
| 2016/0041050 A1 | * | 2/2016 | Vera | G01L 5/22 73/788 |
| 2018/0233884 A1 | * | 8/2018 | Joshi | G01R 31/3277 |

* cited by examiner

*Primary Examiner* — Marthe Y Marc-Coleman
(74) *Attorney, Agent, or Firm* — Hanley, Flight & Zimmerman, LLC (57) ABSTRACT

Aircraft control surface actuation systems and methods are described herein. An example control surface actuation system includes an interface cable, a test interface, and a controller. The test interface is to be disposed in an electrical equipment (EE) bay of an aircraft and operatively coupled to an actuator associated with a control surface of the aircraft. The interface cable is to be connected between the test interface and the controller, and the controller is to transmit a signal via the interface cable to the test interface to control the actuator.

20 Claims, 10 Drawing Sheets

AIRCRAFT CONTROL SURFACE ACTUATION SYSTEMS AND METHODS

FIELD OF THE DISCLOSURE

This disclosure relates generally to aircraft control surfaces and, more particularly, to aircraft control surface actuation systems and methods.

BACKGROUND

Aircraft employ control surfaces, sometimes referred to as auxiliary airfoils or high lift devices, on the wings of the aircraft that can be deployed to maneuver the aircraft and/or control the speed of the aircraft. For example, aircraft wings often include flaperons, spoilers, leading edge slats, etc. These control surfaces may be actuated individually or simultaneously via one or more actuators.

SUMMARY

An example control surface actuation system disclosed herein includes an interface cable and a test interface to be disposed in an electrical equipment (EE) bay of an aircraft. The test interface is to be operatively coupled to an actuator associated with a control surface of the aircraft. The example control surface actuation system also includes a controller. The interface cable is to be connected between the test interface and the controller, and the controller is to transmit a signal via the interface cable to the interface to control the actuator.

An example method disclosed herein includes inserting a test interface into an electrical equipment (EE) bay of an aircraft and connecting an actuator line to the test interface. The actuator line is operatively coupled to an actuator associated with a control surface of the aircraft. The example method also includes connecting an interface cable between the test interface and a controller and operating a switch on the controller to actuate the actuator.

An example controller disclosed herein includes a housing and an interface cable connector disposed on a side of the housing. The interface cable connector is to be operatively coupled to a plurality of control surface actuators associated with a plurality of control surfaces of an aircraft. The example controller also includes a control panel disposed in the housing. The control panel has a plurality of switches corresponding to respective ones of the control surface actuators to enable an operator to control movement of the control surfaces.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example methods, apparatus, systems, and articles of manufacture that may be used to actuate one or more control surfaces (or actuators without the associated control surfaces) during manufacture, testing, and/or maintenance of an aircraft. The examples disclosed herein enable more accurate and safer control of the control surfaces.

In general, many aircraft employ control surfaces, such as spoilers, flaperons, etc. that are moveably coupled to the wings of the aircraft. A control surface may be moved between a stowed or retracted position (a first position) and a deployed or extended position (a second position) via one or more actuator(s). During manufacture and assembly of an aircraft, the control surfaces, such as the spoilers, need to be connected to the wing and the corresponding actuators (referred to herein as rigging) and tested (e.g., moved up and down multiple times to ensure proper function and alignment). In a fly-by-wire aircraft, the spoiler actuators are controlled by a Spoiler Control Electronics (SCE) box disposed in an electrical equipment (EE) bay of the aircraft.

The SCE box receives commands from the controls in the cockpit as well as other sensor data from other flight control systems and determines when to actuate the spoilers. As such, the rigging and testing of the spoilers is usually performed later in the manufacturing process after these other flight control systems are installed and operable. However, it is often desired to be able to rig and test the spoilers at an earlier stage in the manufacturing/assembly process. For example, the spoiler actuators and/or associated hydraulic lines usually need to be filled with hydraulic fluid and bled, which this a time consuming process. Thus, it is often desired to perform the testing process earlier in the manufacturing/assembly process to reduce overall manufacturing/assembly time.

Further, because the SCE box requires inputs (e.g., hydraulic conditions, air ground logic, air data, radio altimeter data, etc.) from multiple flight control systems, controlling the actuators to move the spoilers on demand using the SCE box is difficult and complex (e.g., because the sensor data from other flight control systems may cause the actuator to operate in a different manner). Typically, when rigging the spoilers, one technician or operator in the cockpit attempts to control the spoilers via speed brake, while one or more other technicians on or near the wings of the aircraft attempt to rig the spoilers to the wings and/or the actuators. The technician in the cockpit cannot see the technician(s) working on the wings, so the technicians have to rely on headsets or radios to communicate with each other to maintain a safe work environment when performing this operations.

Disclosed herein are example control surface actuation systems and methods that can be used to operate one or more control surface actuators associated with one or more control surfaces, such as spoilers, on an aircraft independent of other flight control systems, which is advantageous during rigging and testing of the control surfaces. An example control surface actuation system includes a test interface, a controller, and an interface cable coupled between the test interface and the controller. The test interface is to be disposed in the EE bay in place of the SCE box (e.g., in a slot designated for the SCE box). The test interface has one or more connectors to connect to one or more actuator lines (e.g., wires) for controlling the actuators. The controller includes one or more switches for activating one or multiple ones of the control surface actuators. For example, when a particular switch is triggered, a signal (e.g., a voltage and/or current) is transmitted through the test interface to the corresponding actuator, which causes the actuator to move up or down as commanded.

Because the example control surface actuation system does not require inputs from the other flight control systems like the SCE box, the control surface actuation system can be used to rig and test the control surfaces, such as the spoilers, earlier in the manufacturing/assembly process. Therefore, the spoiler actuators can be tested and bled with other ones of the control surface actuators, which usually occurs early in the manufacture/assembly process. Also, by eliminating the SCE box, the example systems and methods reduce the possibility of inadvertent spoiler commands that may otherwise result from SCE fault monitoring. Further, by employing the example control surface actuation systems and methods, the technician with the controller can be positioned in a location (e.g., behind the aircraft) where he/she has a direct line-of-sight to the wing(s) and the other technician(s), which reduces potential miscommunication between the technicians. Also, the controller may be portable, which enables the technician to easily carry the controller around the aircraft while rigging and testing the spoilers, as opposed to being in the cockpit as required with known techniques.

Figure 1:
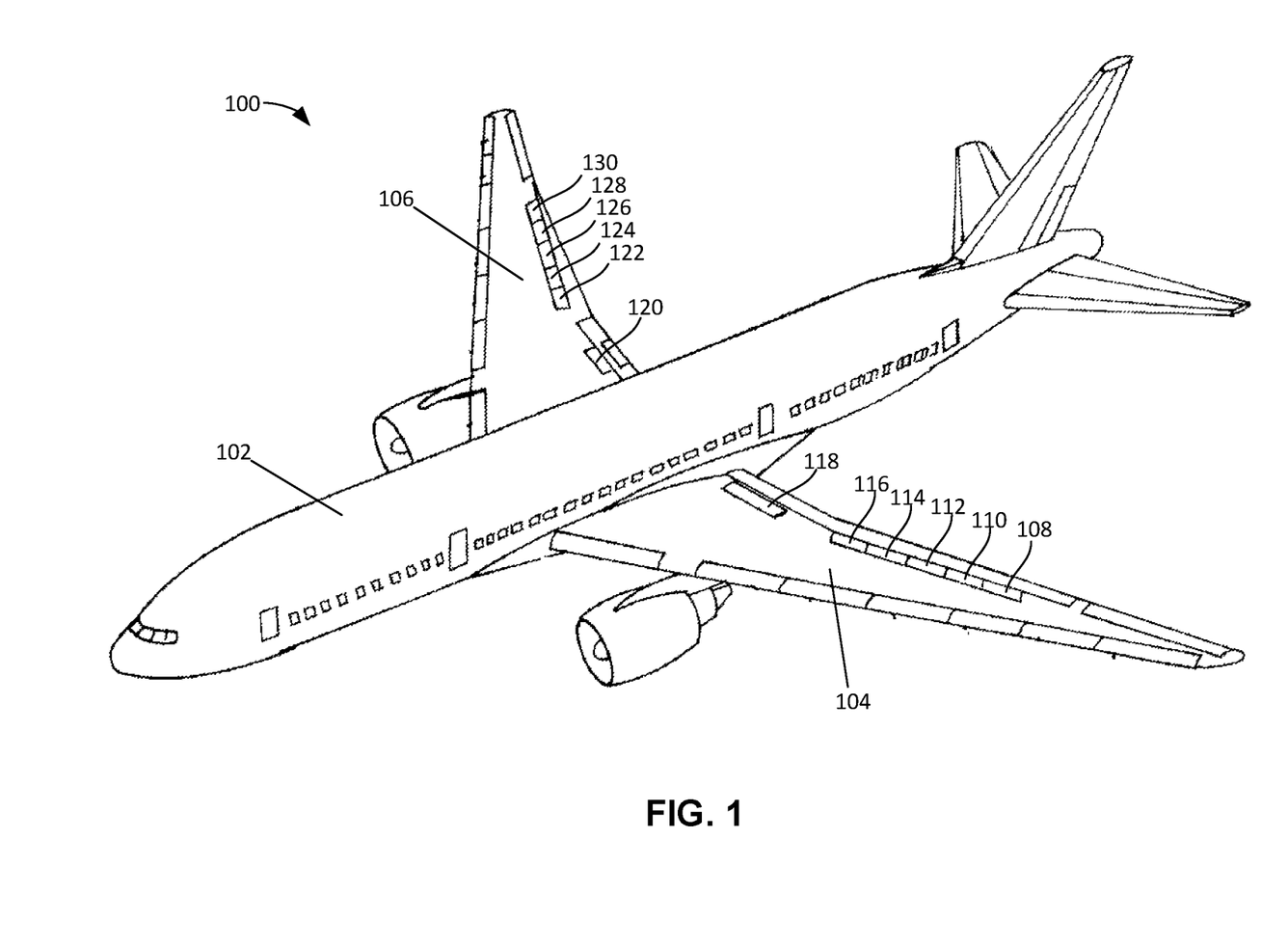
FIG. 1 illustrates an example aircraft with which the examples disclosed herein may be implemented.

FIG. 1 illustrates an example aircraft 100 with which the examples disclosed herein may be implemented. In the illustrated example, the aircraft 100 includes a fuselage 102, a first wing 104 coupled to the fuselage 102, and a second wing 106 coupled to the fuselage 102. The first and second wings 104, 106 may have one or more control surfaces that are located along the first and second wings 104, 106 (e.g., along the top of the wings 104, 106, along the leading and/or trailing edges of the wings 104, 106, etc.). Such control surfaces may be displaced or extended to change the aerodynamic lift of the aircraft 100 and are typically used during takeoff and landing.

For example, in FIG. 1, each of the first wing 104 and second wing 106 includes a plurality of spoilers. In this example, each of the wings 104, 106 includes six spoilers. In particular, the first wing 104 includes a first spoiler 108, a second spoiler 110, a third spoiler 112, a fourth spoiler 114, a fifth spoiler 116, and a sixth spoiler 118. Likewise, the second wing 106 includes a seventh spoiler 120, an eighth spoiler 122, a ninth spoiler 124, a tenth spoiler 126, an eleventh spoiler 128, and a twelfth spoiler 130. In other examples, the first wing 104 and/or the second wing 106 may include more or fewer spoilers. Each of the spoilers 108-130 is moveable between a first position (e.g., a stowed position, as shown in the position in FIG. 1) and a second position (e.g., an up or deployed position) in which the spoiler affects the airflow across the respective wing. One or more of the spoilers 108-130 may be deployed during flight and/or during takeoff and landing, for example.

In some examples, the second, third, fourth, fifth, eighth, ninth, tenth, and eleventh spoilers 110, 112, 114, 116, 122, 124, 126, 128 are considered flight spoilers and the first, sixth, seventh, and twelfth spoilers 108, 118, 120, 130 are considered ground spoilers. In some such examples, the flight spoilers 110-116 and 122-128 are independently controllable, whereas the ground spoilers 108, 118, 120, 130 are controlled as group. In other examples, the aircraft 100 may include more or fewer spoilers and the spoilers 108-130 may be controlled independently or in other groupings.

The example aircraft 100 may include, for example, a fly-by-wire system for controlling the spoilers 108-130 and/or other ones of the control surfaces. In a fly-by-wire system, the controls in the cockpit of the aircraft 100 are not mechanically coupled to the control surfaces. Instead, movement of the controls is converted into electrical signals that are used to actuate the control surface actuators based on the pilot commands.

Figure 2:
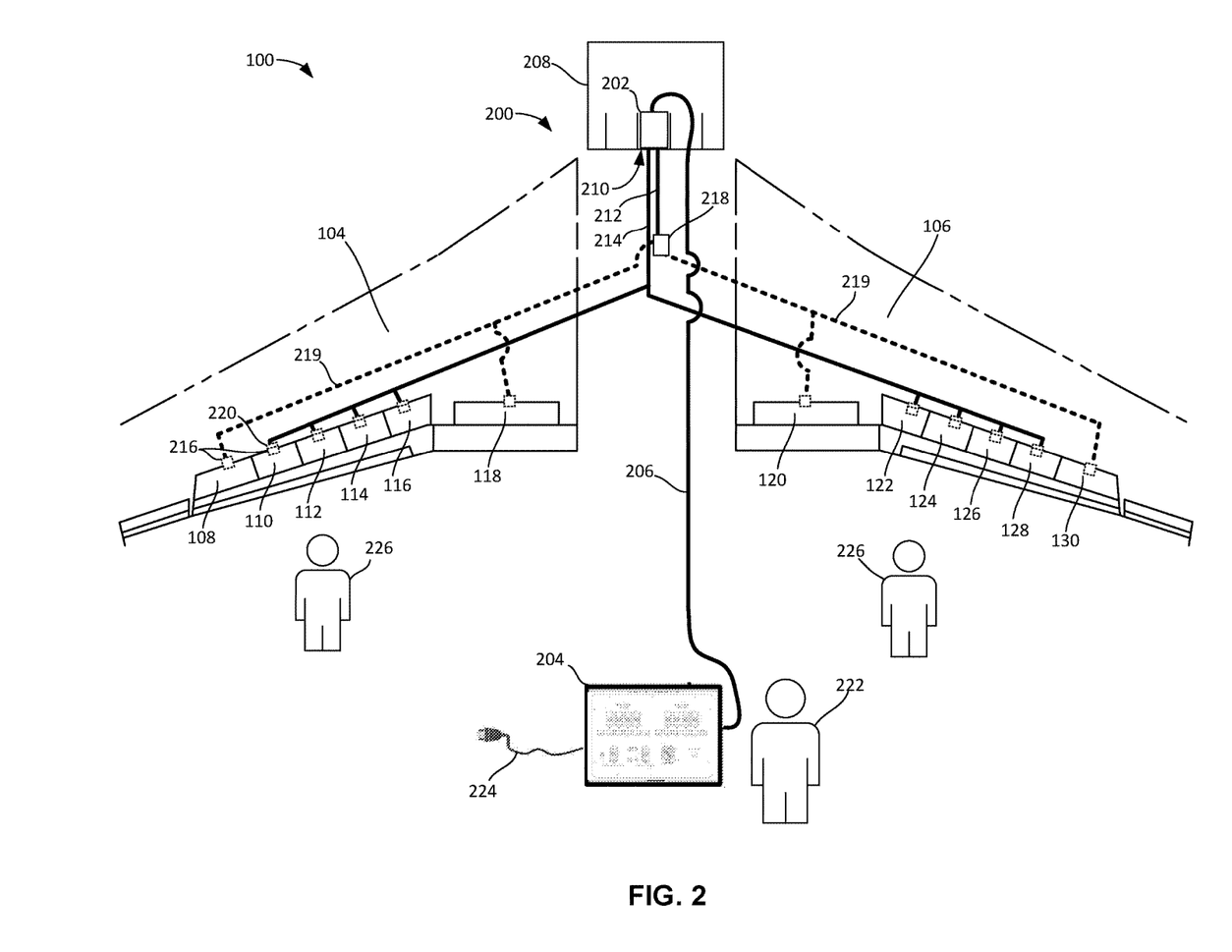
FIG. 2 is a schematic diagram of an example control surface actuation system that may be implemented during manufacture and/or assembly of the example aircraft of FIG. 1.

FIG. 2 illustrates an example control surface actuation system 200 implemented in connection with the example aircraft 100. The control surface actuation system 200 may be used to accurately and safely control the movements of one or more control surfaces of the aircraft 100, such as the spoilers 108-130. In some examples, the control surface actuation system 200 is used in connection with the aircraft 100 during manufacture and/or assembly of the aircraft 100. However, in other examples, the control surface actuation system 200 may be used after manufacture of the aircraft 100, such as for periodic testing or maintenance of the control surface(s). In the illustrated example of FIG. 2, the fuselage 102 and other components of the aircraft 100 have been removed for clarity.

In the illustrated example, the control surface actuation system 200 includes a test interface 202 (referred to herein as the interface 202), a controller 204, and an interface cable 206 connected between the interface 202 and the controller 204 (to electrically couple the controller 204 and the interface 202). In the illustrated example, the interface 202 is disposed in an electrical equipment (EE) bay 208 (sometimes referred to as an avionics bay) of the aircraft 100. For example, the interface 202 may be disposed in a slot 210 of an electrical panel or rack in the EE bay 208 where the SCE box would otherwise be inserted and electrically connected to other flight control systems and the actuator lines (e.g., first and second actuator lines 212, 214). In some examples, the interface 202 is contained in a housing (e.g., a box) substantially the same size as the SCE box. An example implementation of the interface 202 is disclosed in connection with FIGS. 3, 4, and 7.

In the illustrated example, the interface 202 is connected to the first and second actuator lines 212, 214 for actuating the actuators of each of the spoilers 108-130. In particular, the aircraft 100 includes a plurality actuators 216 (shown as dashed boxes, one of which is referenced in FIG. 2) coupled to the wings 104, 106 and associated with certain ones of the spoilers 108-130. The actuator lines 212, 214 include one or more lines or electrical connections (e.g., wires). When a control signal (e.g., a voltage signal) is transmitted via one of the actuator lines 212, 214, the corresponding actuator 216 moves a corresponding one of the spoilers 108-130 from the down or stowed position to the up or deployed position. In some examples, when the control signal is ceased, the corresponding actuator 216 retracts to move the corresponding one of the spoilers 108-130 back to the stowed position. In the illustrated example, only one actuator 216 is provided for each of the spoilers 108-130. However, in other examples, more than one actuator may be associated with a particular spoiler (e.g., a spoiler may be moved via two or more actuators) and/or one actuator may be used to actuate more than one spoiler.

In some examples, the actuators 216 may be, for example, hydraulic actuators. In such an example, when hydraulic fluid is pumped into one of the actuators 216, the actuator 216 lifts or raises the corresponding spoiler 108-130. For example, in the illustrated example of FIG. 2, the first actuator line 212 is connected to a ground spoiler control valve (GSCV) 218 that, when activated (e.g., via a voltage signal), supplies hydraulic fluid via hydraulic lines 219 (shown as dotted lines) to the corresponding actuators 216 of the ground spoilers 108, 118, 120, 130 to actuate the actuators 216 simultaneously. The second actuator line 214 is connected to individual actuators 216 of the flight spoilers 110-116 and 122-128. In particular, each of the actuators 216 of the flight spoilers 110-116 and 122-128 includes an electrohydraulic servovalve (EHSV) 220 (shown as dashed boxes, one of which is reference in FIG. 2) that, when activated (e.g., via a voltage signal), supplies hydraulic fluid to the corresponding actuator 216 to lift the corresponding spoiler. In other examples, one or more of the actuators 216 may be implemented as another type of actuator, such as an electrical actuator, and may be activated in a different manner (e.g., by applying a voltage or current to the actuator).

Each of the actuators lines 212, 214 may include one or more (e.g., a bundle of) wires or other electrical connectors. While two actuator lines 212, 214 are depicted in FIG. 2 for illustrative purposes, it is understood that the actuator lines 212, 214 can be combined into one line or separated into multiple lines routed to the actuators 216 (or an associated control device (e.g., a valve)) for controlling the actuators 216 individually and/or or simultaneously.

In the illustrated example, the controller 204 is operated by a technician 222 (e.g., an operator or other aircraft personnel) and used to active one or multiple ones of the actuators 216 (e.g., to move one or more of the spoilers 108-130). In the illustrated example, the controller 204 includes a power cord 224 that connects to a power source (e.g., an A/C power source) to provide power to the controller 204. The controller 204 includes a control panel with a plurality of switches for activing one or multiple ones of the actuators 216. Example implementations of the controller 204 and the control panel are disclosed in connection with FIGS. 9-14.

The controller 204 enables the technician 222 to be located in a position (e.g., behind the wings 104, 106) where the technician 222 can see one or more of the spoilers 108-130 and one or more other technician(s) 226 working on the spoilers 108-130. Thus, unlike traditional rigging processes that require the technician 222 to be in the cockpit to control the spoilers 108-130 (where the technician's view of the spoilers 108-130 and the other technicians 226 is limited), the technician 222 can be located anywhere around the aircraft 100 to monitor the spoilers 108-130 and/or the other technicians 226 working on the spoilers 108-130. For example, the technician 222 may be located directly behind the aircraft 100 such that the technician 222 has a direct line-of-sight of each of the wings 104, 106. In another example, the technician 222 may stand next to the first wing 104 to watch the other technician 226 working on the first wing 104.

The controller 204 includes one or more switches that enable the technician 222 to activate certain ones of actuators 216 and, thus, if the spoilers 108-130 are coupled to the actuators 216, move the spoilers 108-130. The interface 202 forms an interface between the controller 204 and actuators 216 and, thus, the spoilers 108-130. By activating one or more of the switches, power is supplied through the interface 202 to the actuators 216 (e.g., to the GSCV 218 and/or the EHSVs 220) of the spoilers 108-130. Unlike known SCE boxes, the control surface actuation system 200 does not require inputs from the other flight control systems to operate the actuators 216. Therefore, the example control surface actuation system 200 can be used to rig and test the actuators 216 and/or the spoilers 108-130 earlier in the manufacturing process (without the other flight control systems) and in a safer manner than in known manufacturing processes. Also, the example control surface actuation system 200 can be used to help in bleeding the hydraulic lines associated with the actuators 216 (e.g., by moving one or more of the spoilers 108-130 up and down multiple times).

Figure 3:
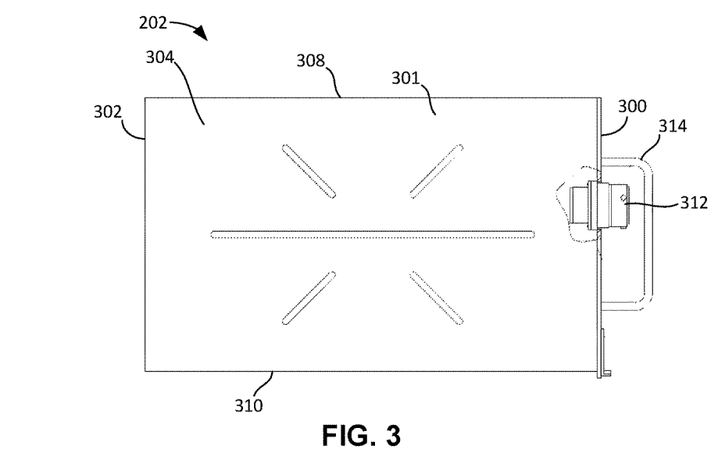
FIG. 3 is a side view of an example implementation of an interface of the example control surface actuation system of FIG. 2.
Figure 4:
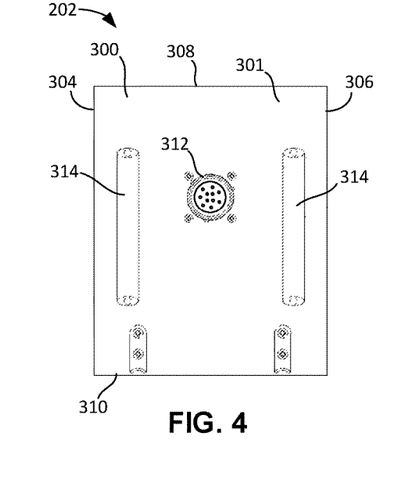
FIG. 4 is a front view of the example implementation of the interface of FIG. 3.

FIG. 3 is a side view of an example implementation of the example interface 202, and FIG. 4 is a front view of the example implementation of the interface 202. In the illustrated example, the interface 202 is contained in a housing or casing 301 having a front side 300, a rear side 302 opposite the front side 300, a left side 304, a right side 306 opposite the left side 304, a top side 308, and a bottom side 310 opposite the top side 308. In some examples, the sides 300-310 of the housing 301 are dimensioned to match the corresponding sides of an SCE box. In other examples, the sides 300-310 may be dimensioned to be larger than or smaller than the corresponding sides of an SCE box. In other examples, the housing 301 may be shaped differently (e.g., as a cylinder).

In the illustrated example of FIGS. 3 and 4, the front side 300 of the housing 301 includes an interface cable connector 312. One end of the interface cable 206 (FIG. 2) is to be connected to the interface cable connector 312 to transmit signals (e.g., voltage and/or current signals) from the controller 204 (FIG. 2) to the interface 202. In some examples, the front side 300 of the housing 301 includes two handles 314 that may be used to carry the interface 202 and/or help in positioning the interface 202 in the EE bay 208 (FIG. 2), for example. In other examples, more than two handles may be included or less than two handles may be included and the handle(s) may be located in other locations on the housing 301. In still other examples, the housing 301 may not include any handles.

Figure 5:
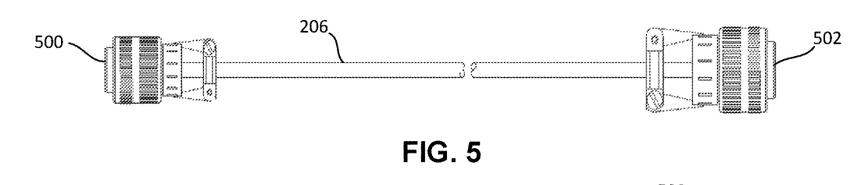
FIG. 5 illustrates an example interface cable that may be used to connect an example interface and an example controller of the example control surface actuation system of FIG. 2.

FIG. 5 is a side view of the example interface cable 206. The interface cable 206 may be any length (e.g., 25 feet, 50 feet, 100 feet, etc.). The example interface cable 206 has a first connector 500 at one end and a second connector 502 at the opposite end. One of the connectors 500, 502 may be connected to the interface 202 (e.g., to the interface cable connector 312 on the housing 301) and the other one of the connectors 500, 502 may be connected to the controller 204 (e.g., to an interface cable connector 920 on of the controller 204 shown in FIGS. 9 and 10) to electrically couple the controller 204 and the interface 202. In some examples, both of the connectors 500, 502 are male connectors or female connectors. In other examples, one of the connectors 500, 502 may be a male connector and the other one of the connectors 500, 502 may be a female connector.

Figure 6:
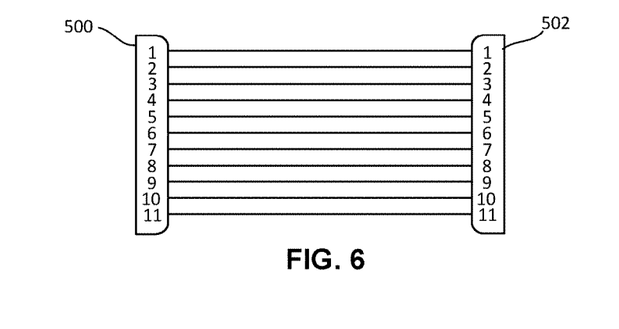
FIG. 6 is a pinout diagram of the example interface cable of FIG. 5.

FIG. 6 is a pinout diagram of the interface cable 206 of FIG. 5. In this example, the interface cable 206 includes eleven lines or electrical connections (e.g., wires) extending between corresponding pins (numbered 1-11) of the first connector 500 and the second connector 502. In this example, the first and second connectors 500, 502 are 11-pin connectors, and each of the pins on one of the connectors 500, 502 corresponds to one of the pins on the other connector 500, 502. In other examples, the first and/or second connectors 500, 502 may include more or fewer pins and/or the interface cable 206 may include more or fewer lines or electrical connectors.

Figure 7A:
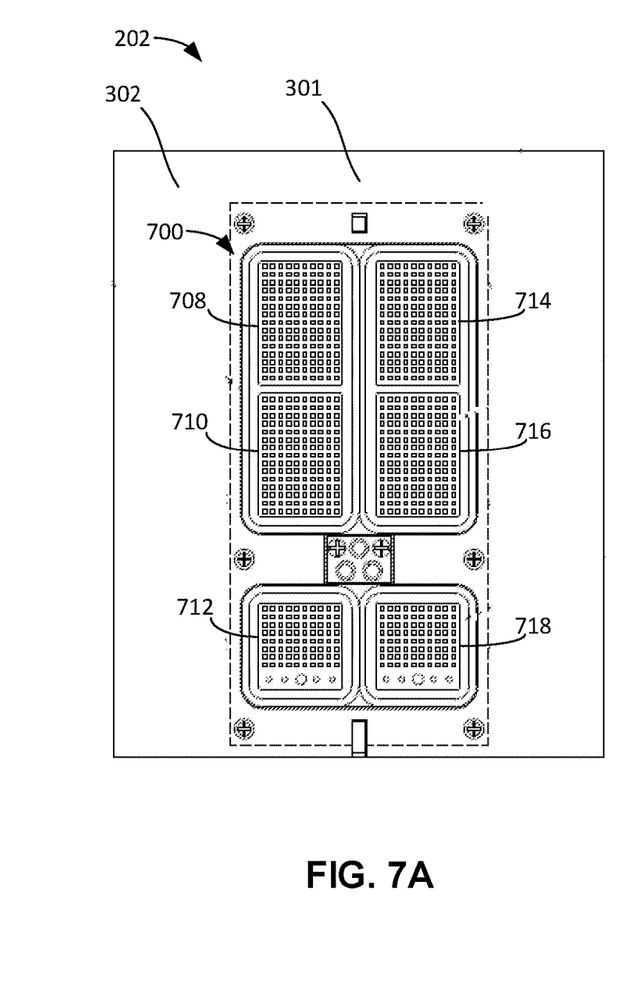
FIG. 7A is a rear view of the example implementation of the interface of FIG. 3.
Figure 7B:
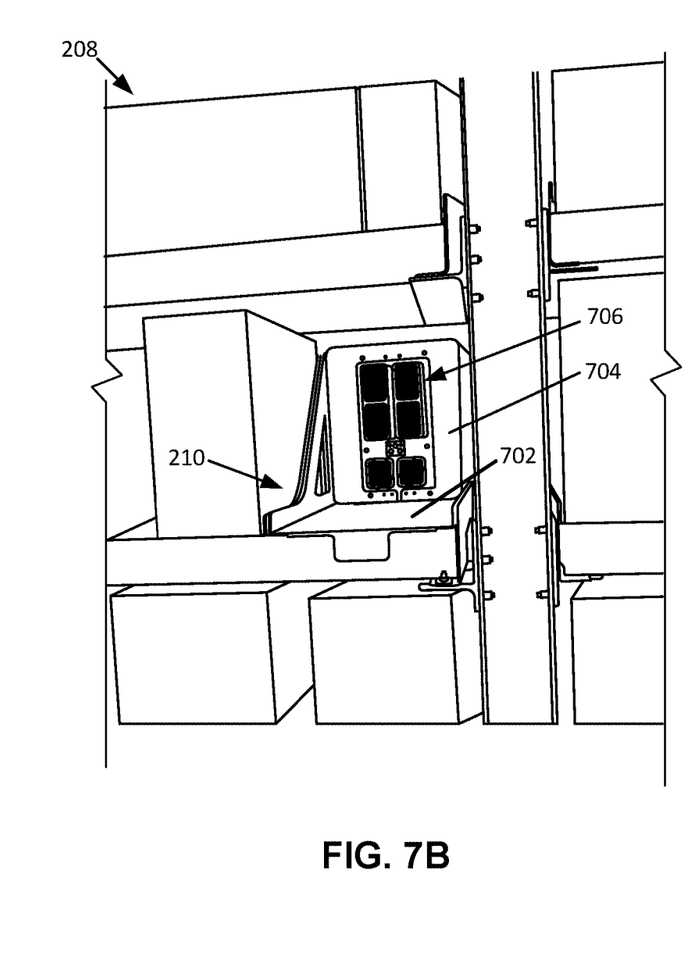
FIG. 7B shows an example slot in an example electrical equipment bay that may receive the example interface of FIG. 7A.

FIG. 7A is a rear view of the example interface 202 showing the rear side 302 of the housing 301, which is opposite the front side 300 of the housing 301 shown in FIG. 4. The rear side 302 of the housing 301 includes a connector 700 (which may be referred to as an actuator line connector) that connects to a corresponding connector in the slot 210 of the EE bay 208 connected to the actuator lines 212, 214 and, thus, to the actuators 216. For example, FIG. 7B shows the example slot 210 of the EE bay 208. The slot 210 is defined by a tray 702 and has a back plate 704. A slot connector 706 is coupled to the back plate 704 in the rear of the slot 210. The slot connector 706 is a multi-pin connector. The actuator lines 212, 214 (FIG. 2) as well as the electrical lines from the other flight control systems are connected to the back of the slot connector 706. In particular, the actuator lines 212, 214, which are connected to the actuators 216 (e.g., to the GSCV 218 and/or the EHSVs 220 in FIG. 2), are connected to certain pins of the slot connector 706, and the electrical lines of the flight control systems are connected to other ones of the pins. In the illustrated example, the slot connector 706 is a double wide connector having six connection areas (e.g., forming a 2×3 connector layout). When the interface 202 is inserted into the slot 210, the bottom side 310 of the housing 301 may rest on the tray 702 and the connector 700 plugs into the slot connector 706. Referring back to FIG. 7A, the connector 700 matches the slot connector 706. In this example, the connector 700 is a double-wide connector having six connecting areas (which may be considered individual multi-pin connectors), including a first connecting area 708, a second connecting area 710, a third connecting area 712, a fourth connecting area 714, a fifth connecting area 716, and a sixth connecting area 718. In the illustrated example, each of the connecting areas 708-718 is a multi-pin connector. In other examples, the connector 700 may be a different type of connector and/or may include more or fewer connecting areas and/or the connecting area(s) may be arranged in a different layout. Also, in other examples, the interface cable connector 312 and/or the connector 700 may be disposed on others sides of the housing 301 and/or on the same side of the housing 301.

Figure 8:
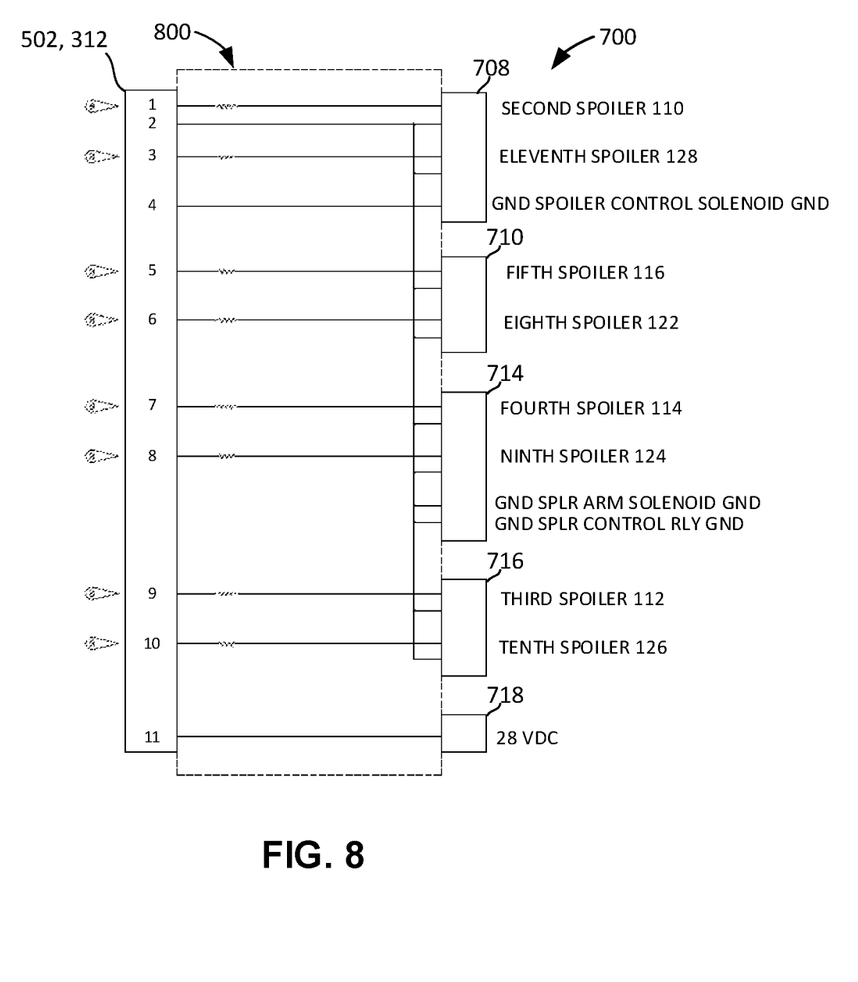
FIG. 8 is a diagram of an example interface circuit that may be implemented in the example interface of FIGS. 3, 4, and 7.

The example interface 202 includes an interface circuit (e.g., which may be disposed within the housing 301) that forms electrical connections between the pins of the interface cable connector 312 (on the front side 300 of the housing 301) and the pins of the connector 700 (on the rear side 302 of the housing 301). FIG. 8 illustrates a diagram of an example interface circuit 800 that may be implemented by the example interface 202. The left side of the interface circuit 800 corresponds to the eleven (11) pins of the interface cable connector 312 that are connected to the pins of the second connector 502 of the interface cable 206. The interface circuit 800 includes eleven lines (referred to herein as Lines 1-11) corresponding to the pins on the interface cable connector 312. The right side of the interface circuit 800 corresponds to the connecting areas 708-718 of the connector 700 that connect to the actuators 216 (e.g., to the GSCV 218 and EHSVs 220) for moving the spoilers 108-130. As illustrated in FIG. 8, Line 1 is connected to a pin of the first connecting area 708 of the connector 700 and provides signals for activating the actuator 216 associated with the second spoiler 110, Line 3 is connected to a pin of the first connecting area 708 of the connector 700 and provides signals for activating the actuator 216 associated with the eleventh spoiler 128, Line 5 is connected to a pin of the second connecting area 710 of the connector 700 and provides signals for activating the actuator 216 associated with the fifth spoiler 116, Line 6 is connected to a pin of the second connecting area 710 of the connector 700 and provides signals for activating the actuator 216 associated with the eighth spoiler 122, Line 7 is connected to a pin of the fourth connecting area 714 of the connector 700 and provides signals for activating the actuator 216 associated with the fourth spoiler 114, Line 8 is connected to a pin of the fourth connecting area 714 of the connector 700 and provides signals for activating the actuator 216 associated with the ninth spoiler 124, Line 9 is connected to a pin of the fifth connecting area 716 of the connector 700 and provides signals for activating actuator 216 associated with the third spoiler 112, and Line 10 is connected to a pin of the fifth connecting area 716 of the connector 700 and provides signals for activating actuator 216 associated with the tenth spoiler 126. In the illustrated example, Line 11 is a power line that is connected to a pin of the sixth connecting area 718 of the connector 700, and Lines 2 and 4 are ground lines that are connected to certain pins of the connector 700. Line 4 provides ground to the ground spoiler actuator(s) (e.g., to the GSCV 218). Line 2 provides ground to each of the flight spoilers 110-116 and 122-128 (e.g., to the EHSVs 220) and to a ground spoiler arm solenoid and the ground spoiler control relay. In other examples, the actuator lines 212, 214 (FIG. 2) may be connected to other ones of the pins on the slot connector 706 and, thus, Lines 1-11 may connect to other ones of the pins of the connector 700 to connect to the corresponding actuator lines. The other remaining pins on the connector 700 may be blank and/or otherwise not connected to anything else. As such, when the electrical lines from the other flight control systems are connected to the connector 700 on the interface 202, the signals from these flight control systems are not used. Instead, the interface circuit 800 only connects the interface cable connector 312 to the pins on the slot connector 706 that correspond to the actuators 216 of the spoilers 108-130.

While in the illustrated example the interface 202 includes the housing 301 containing the interface circuit 800 between the interface cable connector 312 and the connector 700, in other examples, the interface 202 may be implemented without the housing 301. Instead, for example, the interface circuit 800 (e.g., formed on a circuit chip) may be connected between the interface cable 206 and the actuator lines 212, 214 of the slot connector 706.

Figure 9:
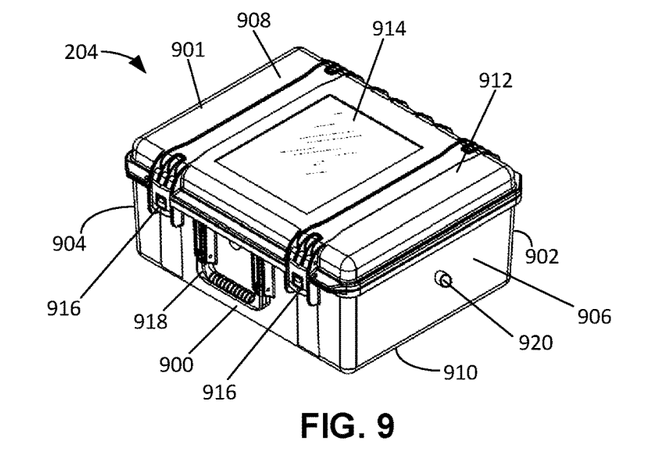
FIG. 9 is a perspective view of an example implementation of a controller of the example control surface actuation system of FIG. 2.
Figure 10:
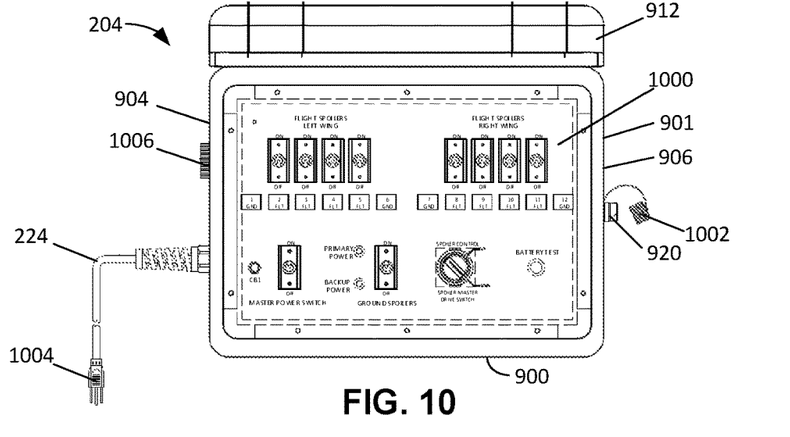
FIG. 10 is a top view of the example implementation of the controller of FIG. 9 with a lid of the controller in an open position showing an example control panel of the controller.
Figure 11:
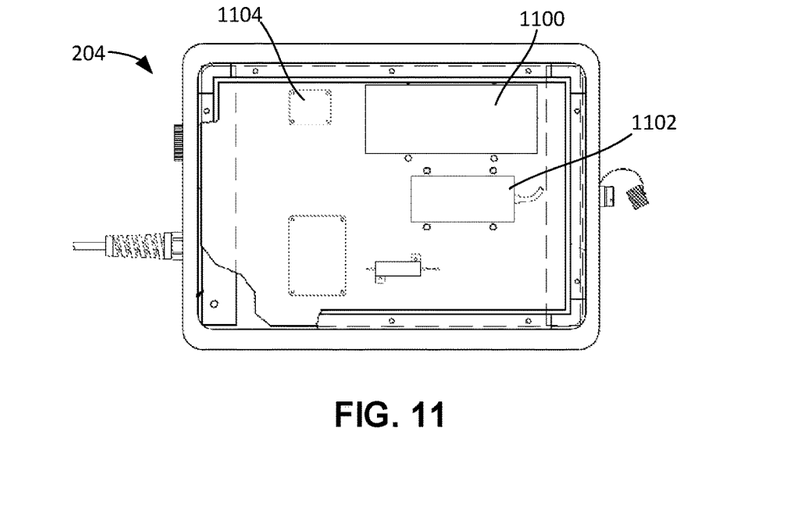
FIG. 11 is another top view of the example implementation of the controller of FIGS. 9 and 10 with the lid and the control panel removed to expose one or more internal component(s) of the controller.

FIGS. 9-11 illustrate an example implementation of the example controller 204. As illustrated in FIGS. 9 and 10, the controller 204 includes a housing or casing 901 defined by a front side 900, a rear side 902 opposite the front side 900, a left side 904, a right side 906 opposite the left side 904, a top side 908, and a bottom side 910 opposite the top side 908. In the illustrated example, the top side 908 is formed by a lid 912. The lid 912 is pivotably coupled to the rear side 902 and can pivot between a closed position (as shown in FIG. 9) and an opened position (as shown in FIG. 10) to expose an internal control panel. In some examples, the lid 912 includes a transparent panel 914 that enables a user to see through the lid 912. The transparent panel 914 may be constructed of, for example, glass, Plexiglas, etc. In some examples, the controller 204 includes one or more latches 916 to secure the lid 912 in the closed position. In some examples, the controller 204 includes a handle 918 for easy carrying or transportation of the controller 204.

As shown in FIG. 10, the lid 912 may be opened to expose a control panel 1000 disposed in the housing 901. In other examples, the controller 204 may not have a lid and the control panel 1000 may form the top side of the controller 204. The control panel 1000 includes one or more switches for controlling one or more of the actuators 216. An example implementation of the control panel 1000 is disclosed in connection with FIG. 12. As shown in FIGS. 9 and 10, the controller 204 includes the interface cable connector 920, which may be connected to one of the connectors 500, 502 (FIG. 5) of the interface cable 206. In the illustrated example, the interface cable connector 920 is disposed on the right side 906 of the controller 204. In other examples, the interface cable connector 920 may be disposed on another side of the controller 204. In some examples, the controller 204 includes a cap 1002 (FIG. 10) that may be used to cover the interface cable connector 920 when the interface cable 206 is not connected to prevent dirt and/or other debris from accumulating in the interface cable connector 920.

As illustrated in FIG. 10, the controller 204 includes the power cord 224, which has an electrical plug 1004, to provide power to the controller 204. The power cord 224 may be connected to any source of power, such as a wall outlet, for example. In the illustrated example, the power cord 224 extends from the left side 904 of the controller 204. In other examples, the power cord 224 may extend from another side of the controller 204. The controller 204 includes a controller circuit that provides electrical connections between the power source, the control panel 1000, and the interface cable connector 920 (and, thus, provides voltage signals to the interface 202). The controller circuit may be disposed in the housing 901 between the control panel 1000 and the bottom side 910 of the housing 901. An example implementation of the controller circuit is disclosed in connection with FIGS. 13 and 14.

FIG. 11 is a top view of the controller 204 in which the lid 912 and the control panel 1000 (FIG. 10) have been removed to show the internal components of the controller 204. In some examples, the controller 204 includes a battery 1100 and a charger 1102 for the battery 1100. In some examples, the battery 1100 may operate as a back-up power source. For example, if power from the power cord 224 ceases, the battery 1100 may turn on to power the controller 204. As such, if one of the spoilers 108-130 is in the up or extended position, for example, and the power from the primary power source ceases, the battery 1100 may provide power to the actuator 216 to prevent the spoiler from suddenly moving back down (which may be the default position for a spoiler). In some examples, the status of the power (from the power cord 224) and/or the battery 1100 may be indicated by one or more lights on the control panel 1000. As illustrated in FIGS. 10 and 11, in some examples, the controller 204 includes a speaker 1006. In some examples, the controller 204 generates an audible alert (e.g., a beep, a repeating beep, etc.), via the speaker 1006, when power from the power cord 224 is lost. For example, the speaker 1006 may generate an alert when the main power is lost and the controller 1006 switches to receive backup power from the battery 1100. Additionally or alternatively, the speaker 1006 may generate an alert when the battery 1100 is low (to alert the technician 222 that power is about to be lost). In the illustrated example, the speaker 1006 is disposed on the left side 904 of the controller 204. In other examples, the speaker 1006 may be disposed on another side of the controller 204. As illustrated in FIG. 11, the controller 204 also includes a circuit card 1104. An example implementation of the circuit card 1104 is disclosed in connection with FIG. 14.

Figure 12:
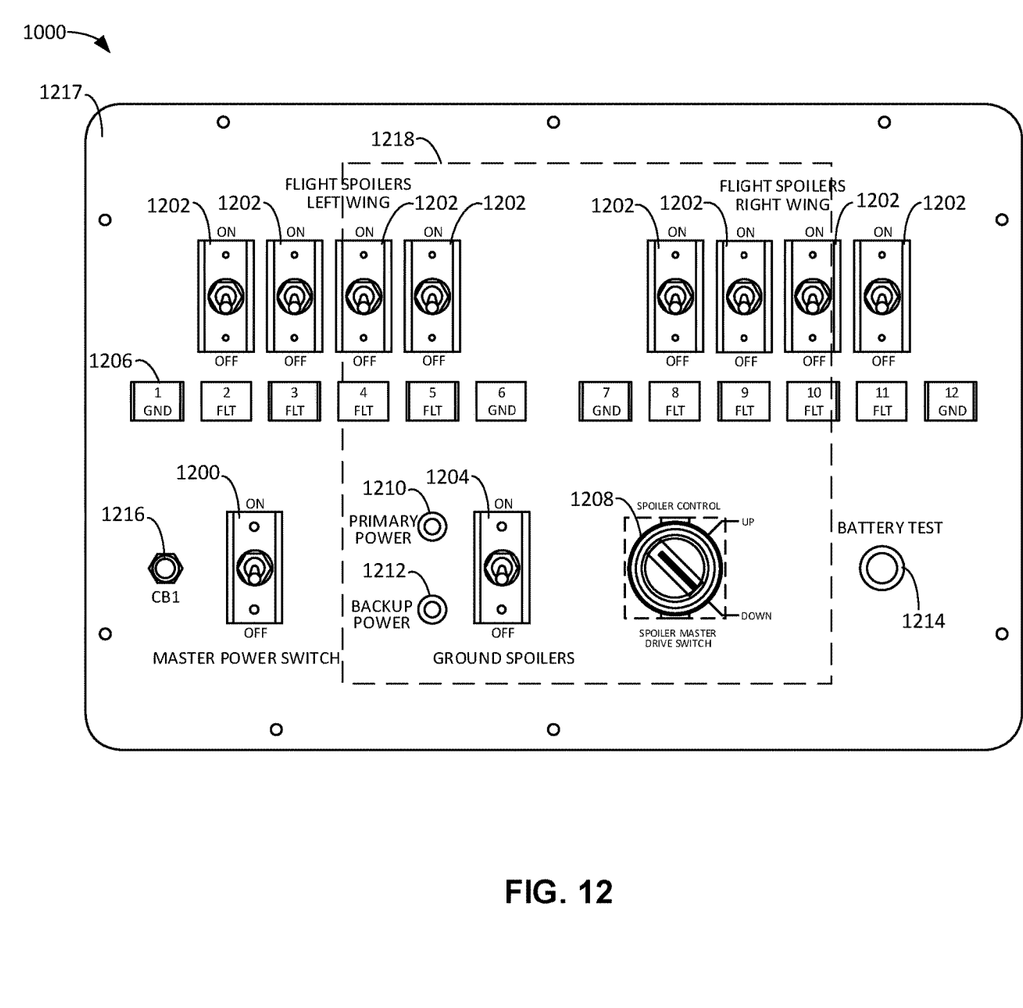
FIG. 12 is an enlarged view of the example control panel of the example controller of FIGS. 9-11.

FIG. 12 an enlarged view of the example control panel 1000 of the controller 204. In the illustrated example, the control panel 1000 includes a master power switch 1200, which is moveable between a first position (an "ON" position) and a second positon (an "OFF" position). If the master power switch 1200 is in the second position (OFF), no power is provide through the controller 204 to the interface 202 (FIG. 2) (e.g., a circuit is not complete) and, thus, the controller 204 cannot be used to operate the actuators 216 (FIG. 2) (to move the spoilers 108-130). If the master power switch 1200 is in the first position (ON), power is supplied to the controller 204, and the controller 204 may be used to activate one or more of the actuators 216 and, thus, move one or more of the spoilers 108-130.

In the illustrated example, the control panel 1000 includes a plurality of switches for activating certain ones of the actuators 216 associated with the spoilers 108-130. In this example, the control panel 1000 includes eight flight spoiler switches 1202 for activating the actuators 216 associated with the flight spoilers 110-116 and 122-128 individually (which are arranged in order from left to right) and a ground spoiler switch 1204 for activating the actuators 216 associated with the ground spoilers 108, 118, 120, 130 simultaneously (e.g., control multiple ones of the actuators 216). In the illustrated example, each of the switches 1202, 1204 is a toggle switch that is moveable between a first position (an "ON" or up position) and a second position (an "OFF" or down position). If one of the switches 1202, 1204 is in the first position (ON), the controller 204 (via a controller circuit) transmits a voltage signal to the corresponding actuator 216 to move the corresponding spoiler 108-130 upward or to the deployed position and, if the respective one of the switches 1202, 1204 is in the second position (OFF), the controller 204 ceases power to the corresponding actuator such that the corresponding actuator 216 moves or maintains the corresponding spoiler 108-130 in the downward or stowed position. The controller 204 is configured to provide the correct electrical voltage and/or current to the actuators 216 to safely control the actuators and, thus, the spoilers 108-130.

For example, if the first flight spoiler switch 1202 (the leftmost flight spoiler switch 1202 in FIG. 12, corresponding to the second spoiler 110) is switched to the first position (ON), the controller 204 transmits a voltage signal, through the interface 202, to the corresponding EHSV 220 to actuate the corresponding actuator 216 and raise the second spoiler 110 (if the second spoiler 110 is coupled to the actuator 216). Then, if the first flight spoiler switch 1202 is switched to the second position (OFF), the controller 204 ceases or stops transmitting the signal, which causes the corresponding actuator 216 to deactivate and move the second spoiler 110 downward or to the stowed position. The other ones of the flight spoiler switches 1202 for the actuators 216 associated with the third, fourth, fifth, eighth, ninth, tenth, and eleventh spoilers 112, 114, 116, 122, 124, 126, 128 may operate in substantially the same manner.

In some examples, the ground spoiler switch 1204 actuates the actuators 216 associated with the ground spoilers 108, 118, 120, 130 simultaneously. For example, if the ground spoiler switch 1204 is switched to the first position (ON), the controller 204 transmits a signal through the interface 202 to the GSCV 218 to actuate the corresponding actuators 216 and raise the ground spoilers 108, 118, 120, 130 (if the ground spoilers 108, 118, 120, 130 are connected to the actuators 216). On the other hand, if the ground spoiler switch 1204 is switched to the second position (OFF), the controller 204 ceases or stops transmitting the signal, which causes the corresponding actuators 216 to deactivate and move the ground spoilers 108, 118, 120, 130 downward or to the stowed position. In other examples, one or more other switches may be provided to individually control the ground spoilers 108, 118, 120, 130, similar to the manner in which the flight spoilers 110-116 and 122-128 are controlled. In other examples, other ones of the spoilers 108-130 may be grouped together and simultaneously controlled via a single switch.

In the illustrated example, the control panel 1000 includes a plurality of lights 1206 (one of which is referenced in FIG. 12) that indicate the switches 1202, 1204 that are activated (e.g., in the first position (ON)) and, thus, which of the actuators 216 and/or spoilers 108-130 are to be activated. For example, if the first flight spoiler switch 1202 is in the first position (ON) (corresponding to the second spoiler 110), the corresponding light 1206 (labeled "2 FLT") may be illuminated, and if the first flight spoiler switch 1202 is in the second position (OFF), the corresponding light 1206 may not be illuminated. Similarly, if the ground spoiler switch 1204 is in the first position (ON), the lights 1206 corresponding to the first, sixth, seventh, and twelfth spoilers 108, 118, 120, 130 may be illuminated. In other examples, one or more of the lights 1206 may be illuminated one color or blink pattern when the corresponding switch 1202, 1204 is in one position and illuminated another color or blink pattern when the corresponding switch 1202, 1204 is in the other position. In the illustrated example, the lights 1206 are arranged in a row from left to right that matches the layout of the spoilers 108-130 (from the outboard section of the first wing 104 to the outboard section of the second wing 106), which facilitates recognition of the spoiler configuration. Further, the lights 1206 corresponding to the flight spoilers 110-116 and 122-128 are arranged directly below the corresponding flight spoiler switches 1202 for the flight spoilers 110-116 and 122-128. Therefore, a least a portion of the switches (e.g., the flight spoiler switches 1202) are arranged in an order that matches a layout of the spoilers 108-130, and which also facilities recognition and understanding of which one of the spoilers 108-130 is being controlled when using the controller 204. In other examples, the lights 1206 and/or the switches 1202, 1204 may be arranged in other layouts.

In some examples, to prevent inadvertent activation of the spoiler(s) 108-130, the example controller 204 may include a spoiler master drive switch 1208. In the illustrated example, the spoiler master drive switch 1208 is a turn switch that is moveable between an OFF position (labeled "DOWN") and an ON position (labeled "UP"). If the spoiler master drive switch 1208 is in the OFF position, the spoiler master drive switch 1208 prevents power or voltage signals from being transmitted to the actuators 216, even if the flight spoiler switches 1202 and/or ground spoiler switch 1204 are in the first positions (ON). Therefore, the controller 204 only transmits voltage signals when one or more of the switches 1202, 1204 is/are in the first position (ON) and the spoiler master drive switch 1208 is in the ON position. As such, the spoiler master drive switch 1208 provides a safety mechanism to prevent accidental actuation of the spoilers 108-130. In some examples, the controller 204 may include one or more locking features to receive one or more locking devices to comply with lock-out tag-out procedures (e.g., one or more pins (and/or lock(s)) that may be inserted through one or more of the switches 1200, 1202, 1204, 1208 to prevent the switches 200, 1202, 1204, 1208 from being moved, a key lock on the housing 901 to prevent the lid 912 from being opened, etc.).

In an example operation, the spoiler master drive switch 1208 is in the OFF position and the technician 222 (FIG. 2) may move one or more of the switches 1202, 1204 to their first position(s) (ON) based on the desired spoilers 108-130 and/or actuators 216 to actuate. When the switch(es) 1202, 1204 are moved to their first position(s) (ON), the light(s) 1206 corresponding to the switch(es) 1202, 1204 are activated (e.g., illuminated, blinking). However, because the spoiler master drive switch 1208 is in the OFF positon, none of the actuators 216 is actuated and, thus, none of the spoilers 108-130 are moved. Then, when the technician 222 is ready to actuate the actuators 216 corresponding to the triggered switches 1202, 1204, the technician 222 move (e.g., turn) the spoiler master drive switch 1208 to the ON position, at which point the signals are transmitted (via the interface 202) to the actuator(s) 216 corresponding to the activated ones of the switches 1202, 1204. In another example operation, the spoiler master drive switch 1208 may be left in the ON position, and the individual switches 1202, 1204 may be activated to move the actuators 216 on demand.

In the illustrated example, the components of the control panel 1000 (e.g., the master power switch 1200, the flight spoiler switches 1202, etc.) are mounted on a plate or substrate 1217 (e.g., a metal plate). While in the illustrated example the switches 1200, 1202, and 1204 are toggle switches and the master drive switch 1208 is a turn switch, in other examples, one or more of the switches 1200, 1202, 1204, and/or 1208 may be implemented as other types of switches, such as a rocker switch, a push button switch, a dual position turn switch, a slide switch, etc. Further, while in some examples the switches 1202, 1204 are only moveable between the first position and the second position, in other examples, other types of switches may be implemented that can control the actuators 216 to move partially between the down and up positions (e.g., by proving a reduce voltage signal).

In the illustrated example, the control panel 1000 includes a primary power light 1210 and a backup power light 1212. The primary power light 1210 may be activated (e.g., illuminated with a constant or blinking light) when the primary power from the power cord 224 (FIG. 2) is providing power to the controller 204, whereas the backup power light 1212 may be activated if power from the battery 1100 is providing power to the controller 204 (e.g., during a power loss situation or, more generally, when power is not accessible).

In some examples, the control panel 1000 includes a battery test button 1214. The battery test button 1214 may be pressed to test the amount of charge in the battery 1100. In some examples, if the battery 1100 has a charge satisfying a threshold (e.g., above a threshold voltage), a light in the battery test button 1214 is activated. Whereas, if the charge of the battery 1100 does not satisfy the threshold, the light in the battery test button 1214 is not activated, thereby signaling to the technician 222 that backup power is low. In the illustrated example, the control panel 1000 includes a circuit breaker 1216, which cuts power to the rest the controller 204 if excessive power is supplied to the controller 204. For example, if excessive power is supplied to the controller 204, the circuit breaker 1216 may trigger (e.g., pop out) to open the circuit and cut-off power. Then, the circuit breaker 1216 may be pressed back in to reset/complete the circuit.

In the illustrated example, a dashed box 1218 is shown that represents the area of the control panel 1000 that is viewable through the transparent panel 914 (FIG. 9) of the lid 912 (FIG. 12) when the lid 912 is closed. In other examples, the transparent panel 914 may be larger or smaller and/or positioned in a different area such more or less of the control panel 1000 and/or a different area of the control panel 1000 is viewable through the lid 912.

Figure 13:
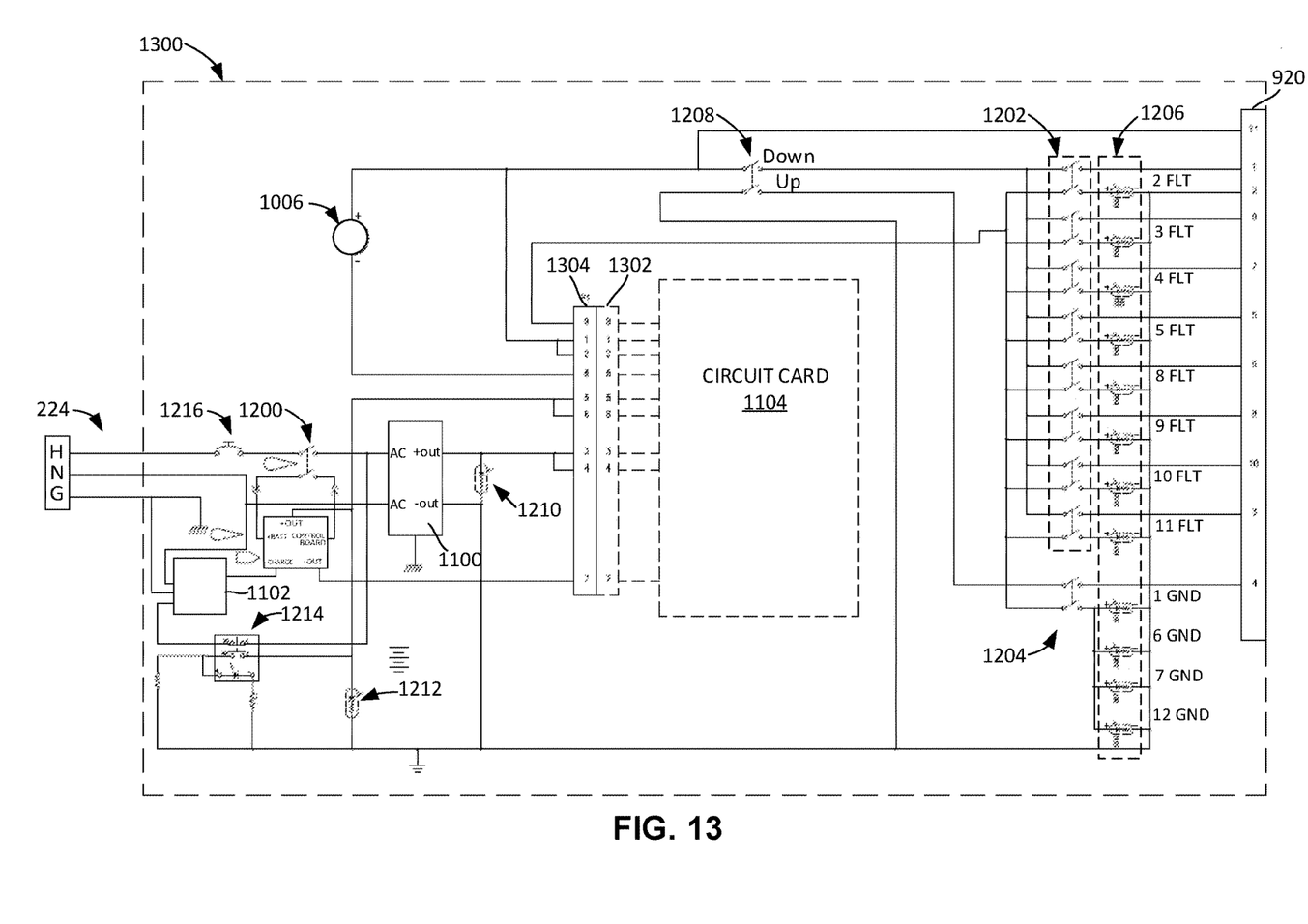
FIG. 13 is a diagram of an example controller circuit that may be implemented in the controller of FIGS. 9-11.
Figure 14:
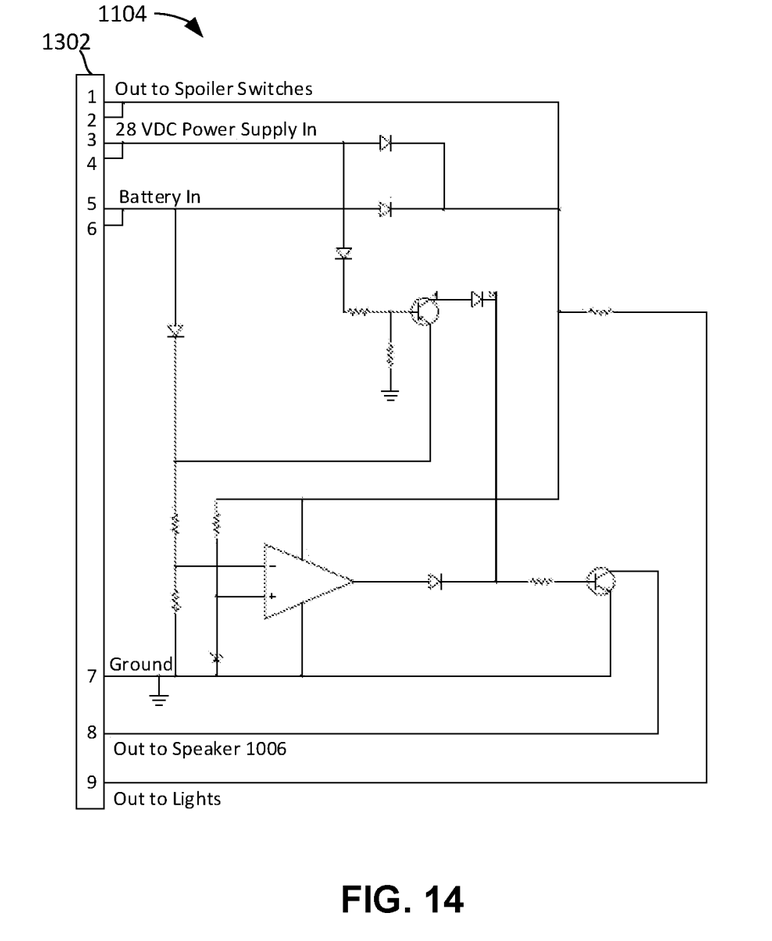
FIG. 14 is a diagram of an example circuit card that may be implemented in the example controller circuit of FIG. 13.

FIG. 13 is a diagram of an example controller circuit 1300 that may be implemented in the controller 204. The diagram shows the power cord 224, the speaker 1006, the battery 1100, the charger 1102, the master power switch 1200, the flight spoiler switches 1202, the ground spoiler switch 1204, the lights 1206, the spoiler master drive switch 1208, the primary power light 1210, the backup power light 1212, the battery test button 1214, and the circuit breaker 1216. Also shown is the interface cable connector 920, which has eleven pins, corresponding to the eleven pins of the interface cable connector 312 (FIG. 3) on the interface 202 (FIG. 3). In the illustrated example, the controller circuit 1300 includes the circuit card 1104. The circuit card 1104 has a first connector 1302 that connects to a second connector 1304 of the example controller circuit 1300. In the illustrated example, the first and second connectors 1302, 1304 are nine pin connectors. FIG. 14 is a diagram of the circuit card 1104. In FIG. 14, the left side shows the first connector 1304 and the nine pins.

While in the illustrated example of FIGS. 9-14, the controller 204 includes physical switches for controlling the actuators 216, in other examples, the controller 204 may be implemented by another type of device, such as a computing device with a screen (e.g., a touch screen) for digitally controlling the actuators 216. For example, the controller 204 may be implemented on a laptop computer, a personal computer, a phone (e.g., a smart phone), a tablet, or any other electronic device. The computing device may include a screen with digital buttons that may be used similar to switches disclosed in connection with FIG. 12.

Figure 15:
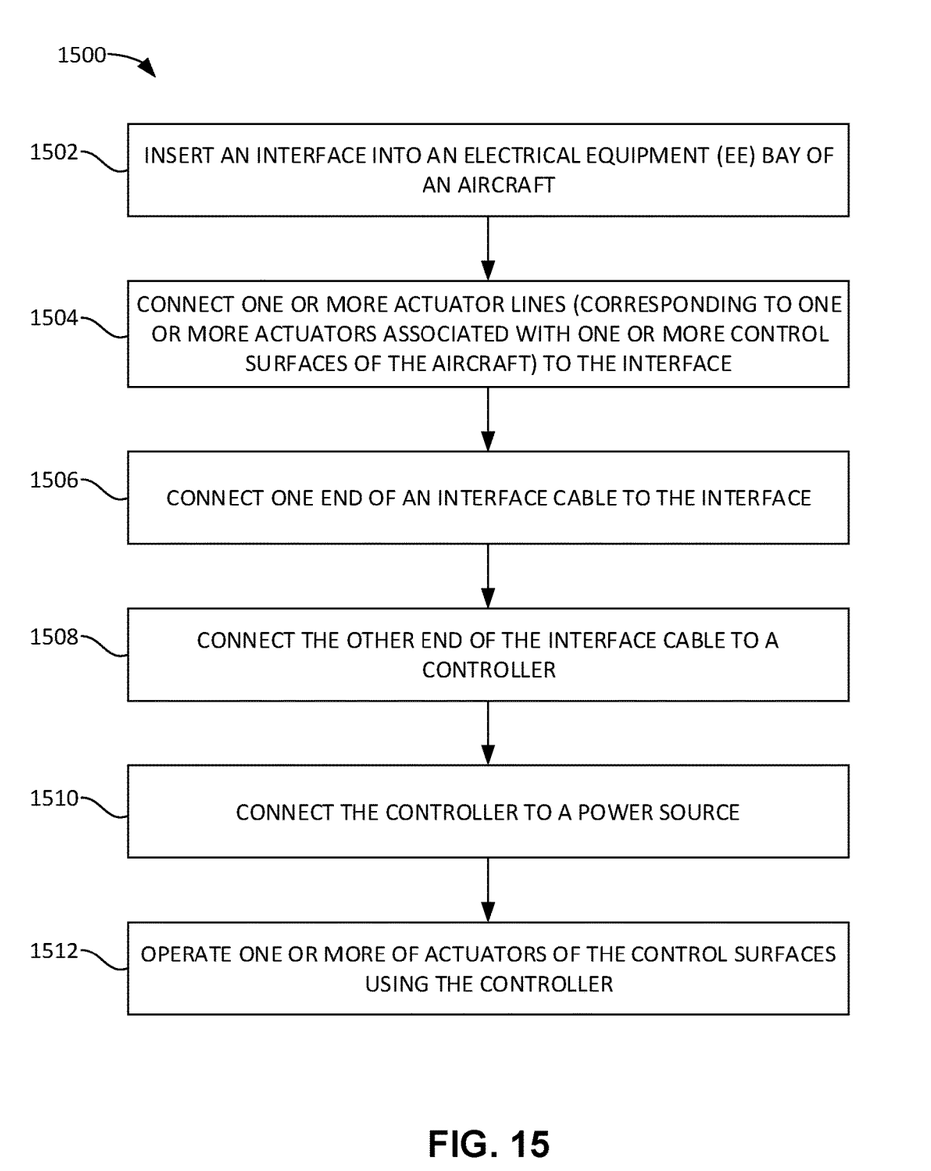
FIG. 15 is a flowchart representative of an example method of that may be performed with the example control surface actuation system of FIG. 2 to control movement of a control surface actuator of the aircraft.

FIG. 15 is a flowchart representative of an example method 1500 that may be performed with the example control surface actuation system 200 of FIG. 2 to control the actuation of one or more actuators for one or more control surfaces of an aircraft. The example method 1500 is described in connection with the spoilers 108-130 of the example aircraft 100 of FIGS. 1 and 2. The example control surface actuation system 200 may be used during manufacture and assembly of an aircraft and/or for repair or routine maintenance of an already assembled/operable aircraft.

The example method 1500 includes inserting an interface into an EE bay of an aircraft (block 1502). For example, the interface 202 may be inserted into the slot 210 in the EE bay 208 where the SCE box would otherwise be inserted and connected. However, unlike an SCE box, the interface 202 does not require inputs from the other flight control systems.

The example method 1500 includes connecting one or more actuator lines, which correspond to one or more actuators for one or more control surfaces, to the interface (block 1504). For example, referring to FIGS. 7A and 7B, when the interface 202 is inserted into the slot 210, the connector 700 on the interface 202 connects to the slot connector 706, which is connected to the actuator lines 212, 214 (FIG. 2). In some examples, the actuator lines 212, 214 are connected to one or more valves (e.g., the GSCV 218 and/or one or more of the EHSVs 220) for controlling the flow of hydraulic fluid to the actuators 216. In other examples, the actuators 216 may be electric actuators and the actuator lines 212, 214 may provide signals directly to the actuators 216 for actuating the actuators 216.

The example method 1500 includes connecting one end of an interface cable to the interface (block 1506). For example, one of the connectors 500, 502 (FIG. 5) of the interface cable 206 may be connected to the interface cable connector 312 (FIGS. 3 and 4) of the interface 202.

The example method 1500 includes connecting the other end of the interface cable to a controller (block 1608). For example, the other one of the connectors 500, 502 (FIG. 5) of the interface cable 206 may be connected to the interface cable connector 920 (FIGS. 9 and 10) of the controller 204.

The example method 1500 of FIG. 15 includes connecting the controller to a power source (block 1510). In some examples, the controller may be connected to an external power source. For example, the power cord 224 (FIG. 2) of the example controller 204 may be plugged into a wall outlet or other source of external power. Additionally or alternatively, the controller 204 may include a battery (e.g., the battery 1100 of FIG. 11) to provide power (e.g., if the main source of power ceases).

The example method 1500 includes operating one or more of the actuators (e.g., to move one or more of the control surfaces) using the controller (block 1512). For examples, the technician 222 may use one or more of the switches 1202, 1204 to actuate one or more of the actuators 216 and, thus, move or more of the spoilers 108-130 (if the spoilers 108-130 are connected to the respective actuators 216).

Although the example method 1600 is described with reference to the flowchart illustrated in FIG. 16, many other methods may alternatively be used. For example, the order of execution of the blocks may be changed, and/or some of the blocks described may be changed, eliminated, or combined.

From the foregoing, it will be appreciated that example methods, apparatus, systems, and articles of manufacture have been disclosed that can be used to control one or more actuators and/or associated control surfaces of an aircraft. The examples disclosed herein reduce aircraft build time and allow certain operations to be performed earlier in the build cycle. Further, the examples disclosed herein enable increased safety for procedures related to working on and testing control surfaces of an aircraft.

While some of the examples disclosed herein are described in connection with actuators associated with spoilers of an aircraft, the examples disclosed herein can similarly be implemented with actuators associated with other types of control surfaces, such as the flaperons, ailerons, leading slats, etc.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A control surface actuation system comprising:
an interface cable;
a test interface to be disposed in an electrical equipment (EE) bay of an aircraft, the test interface to be electrically coupled to an actuator or a valve associated with the actuator, the actuator associated with a control surface of the aircraft; and
a controller, the interface cable to be connected between the test interface and the controller, the controller to transmit a control signal via the interface cable and the test interface to activate and control the actuator.

2. The control surface actuation system of claim 1, wherein the control surface is a spoiler.

3. The control surface actuation system of claim 1, wherein the test interface is contained in a housing and includes an interface cable connector to be electrically coupled to the interface cable and an actuator line connector to be electrically coupled to an actuator line electrically coupled to the actuator or the valve associated with the actuator, the interface cable connector disposed on a first side of the housing and the actuator line connector disposed on a second side of the housing opposite the first side.

4. The control surface actuation system of claim 3, wherein the housing of the test interface has a size substantially matching a size of a Spoiler Control Electronics (SCE) box, and wherein the housing is to be disposed in a slot in the EE bay designated for the SCE box.

5. The control surface actuation system of claim 1, wherein the controller includes a control panel having a switch that is moveable between a first position and a second position, the controller to transmit the control signal when the switch is in the first position and not transmit the control signal when the switch is in the second position.

6. The control surface actuation system of claim 5, wherein the control panel includes a master drive switch that is moveable between an ON position and an OFF position, and wherein the controller only transmits the control signal when the switch is in the first position and the master drive switch is in the ON position.

7. The control surface actuation system of claim 5, wherein the test interface is to be operatively coupled to a plurality of actuators associated with a plurality of control surfaces of the aircraft, and wherein the control panel includes a plurality of switches corresponding to one or more of the plurality of actuators.

8. The control surface actuation system of claim 7, wherein the plurality of switches are arranged in an order that matches a layout of the plurality of control surfaces.

9. The control surface actuation system of claim 7, wherein at least one of the plurality of switches controls multiple ones of the actuators.

10. The control surface actuation system of claim 5, wherein the control panel includes a light, and wherein the light is to be activated when the switch is in the first position.

11. The control surface actuation system of claim 1, wherein the controller includes a power cord to be connected to a power source and a battery to provide backup power.

12. The control surface actuation system of claim 11, wherein the controller includes a speaker to generate an audible alert when the controller receives backup power from the battery.

13. The control surface actuation system of claim 11, wherein the controller includes a battery test button to test an amount of charge in the battery.

14. A method comprising:
inserting a test interface into an electrical equipment (EE) bay of an aircraft;
connecting an actuator line to the test interface, the actuator line is operatively coupled to an actuator associated with a control surface of the aircraft;
connecting an interface cable between the test interface and a controller; and
operating a switch of the controller to generate a control signal, the control signal transmitted via the interface cable and the test interface to activate and control the actuator.

15. The method of claim 14, further including, prior to operating the switch of the controller, connecting the controller to an external power source.

16. The method of claim 14, wherein inserting the test interface includes inserting the test interface into a slot in the EE bay designated for a Spoiler Control Electronics (SCE) box.

17. The method of claim 14, wherein the control surface is a spoiler.

18. A controller comprising:
a housing;
an interface cable connector disposed on a side of the housing, the interface cable connector to be operatively coupled to a plurality of control surface actuators associated with a plurality of control surfaces of an aircraft; and
a control panel disposed in the housing, the control panel having a plurality of switches corresponding to respective ones of the control surface actuators to enable an operator to control movement of the control surfaces, the plurality of switches arranged in an order that matches a layout of the plurality of control surfaces.

19. The controller of claim 18, wherein the housing includes a lid that is moveable between an open position in which the control panel is exposed and a closed position in which the control panel is covered.

20. The controller of claim 19, wherein the lid includes a transparent panel to enable the operator to view the control panel through the lid when the lid is in the closed position.

* * * * *